(12) United States Patent
Boggs et al.

(10) Patent No.: US 10,909,715 B1
(45) Date of Patent: Feb. 2, 2021

(54) HIGH-INTEGRITY OPTICAL POSE ESTIMATION USING CODED FEATURES

(71) Applicant: Rockwell Collins, Inc., Cedar Rapids, IA (US)

(72) Inventors: Christopher M. Boggs, Gainesville, VA (US); William T. Kirchner, Ashburn, VA (US); Ankur Ankur, Arlington, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 73 days.

(21) Appl. No.: 16/263,388

(22) Filed: Jan. 31, 2019

(51) Int. Cl.
- *G06T 7/70* (2017.01)
- *G02B 27/00* (2006.01)
- *G06T 7/20* (2017.01)
- *G02B 27/01* (2006.01)
- *G06F 3/01* (2006.01)

(52) U.S. Cl.
CPC ............ *G06T 7/70* (2017.01); *G02B 27/0093* (2013.01); *G02B 27/017* (2013.01); *G06F 3/012* (2013.01); *G06T 7/20* (2013.01); *G06T 2207/30208* (2013.01)

(58) Field of Classification Search
CPC ... G06T 7/70; G06T 7/20; G06T 2207/30208; G02B 27/017; G02B 27/0093; G06F 3/012

USPC .......................................................... 382/103
See application file for complete search history.

(56) References Cited

U.S. PATENT DOCUMENTS

| 2013/0234850 A1* | 9/2013 | Lee ......................... A61B 5/681 340/12 |
| 2014/0212000 A1* | 7/2014 | Yagcioglu .......... G06K 9/00362 382/103 |
| 2020/0005448 A1* | 1/2020 | Subramanian .......... G06F 30/17 |

OTHER PUBLICATIONS

Cai, Xingcheng. A Prototype Helmet Fitting System for Concussion Protection. Diss. M. Sc. thesis, School of Computing, Queen's University, Kingston, Ontario, Canada, 2015. (Year: 2015).*

* cited by examiner

*Primary Examiner* — Amandeep Saini
(74) *Attorney, Agent, or Firm* — Suiter Swantz pc llo

(57) ABSTRACT

A head tracking system uses coded features, highly structured compared to the operating environment, to ensure a high-integrity correspondence map. Coded features can be used to provide a negligible probability of spurious features and probability of misidentification. Ensuring a reliable correspondence map prevents unmodeled errors that arise from an invalid correspondence map. In the case of multiple outliers, existing screening techniques, such as random sample consensus (RANSAC) or fault exclusion, may be used to eliminate excessive outliers. Mature GPS integrity techniques may then be extended to optical pose estimation to establish integrity bounds for single faults that may go undetected by fault detection.

17 Claims, 7 Drawing Sheets

HIGH-INTEGRITY OPTICAL POSE ESTIMATION USING CODED FEATURES

BACKGROUND

Optical pose estimation is used increasingly in avionics applications such as optical head trackers for head-worn displays (HWD) that show flight guidance cues to pilots or image-based relative navigation for platform-based terminal guidance and formation flying. Computer vision-based solutions are attractive because they offer low SWAP-C and availability when other sensor modalities are not available (e.g., GPS, Radio, magnetometer). However, for an optical pose estimate to be used in a safety-critical application, the pose estimate must also include integrity bounds that overbound the pose estimation error with high confidence to prevent hazardous, misleading information.

Model-based pose estimation is typically performed by adjusting the pose estimate such that it minimizes reprojection error between measured 2D points (detected in the image) and projected 2D feature points (determined by projecting a constellation of 3D points into the image plane). The correspondence mapping between measured 2D points and constellation 3D points is typically not known, and a high number of spurious correspondence pairings are common. The large number of combinations of potential correspondence maps makes error modeling challenging, if not intractable. However, given that the correspondence map is correct, error modeling simplifies drastically.

SUMMARY

In one aspect, embodiments of the inventive concepts disclosed herein are directed to coded features, highly structured compared to the operating environment, to ensure a high-integrity correspondence map. Coded features can be used to provide a negligible probability of spurious features and probability of misidentification. Ensuring a reliable correspondence map prevents unmodeled errors that arise from an invalid correspondence map. In the case of multiple outliers, existing screening techniques, such as random sample consensus (RANSAC) or fault exclusion, may be used to eliminate excessive outliers. Mature GPS integrity techniques may then be extended to optical pose estimation to establish integrity bounds for single faults that may go undetected by fault detection.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
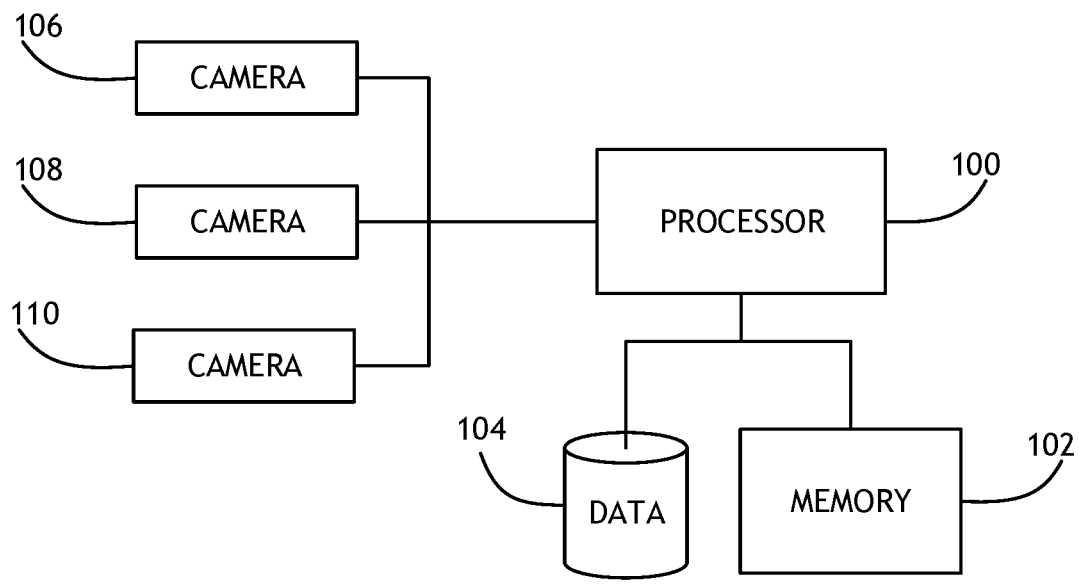
FIG. 1 shows a block diagram of a system for implementing exemplary embodiments of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a pose tracking and verification system for determining poses from fiducials with coded dimensional features. While specific embodiments described herein are directed toward head tracking systems, the principles described are generally applicable to any system with one or more cameras rigidly affixed to one body and one or more fiducials with coded features rigidly affixed to a second body.

Referring to FIG. 1, a block diagram of a system for implementing exemplary embodiments of the inventive concepts disclosed herein is shown. The system includes a processor 100, a memory 102 connected to the processor 100 for embodying processor executable code, a data storage element 104 storing data specific to one or more fiducials, and one or more cameras 106, 108, 110. The processor 100 is configured to receive images of the fiducials from the one or more cameras 106, 108, 110, retrieve data pertaining to each fiducial from the data storage element 104, and use the data make determinations about error probability of a resulting head pose calculation as more fully described herein.

It will be appreciated that, while some embodiments described herein specifically refer to environmental cameras and fiducials affixed to a helmet (and vice-versa), all of the principles and methodologies disclosed are equally applicable to either type of embodiment.

Figure 2:
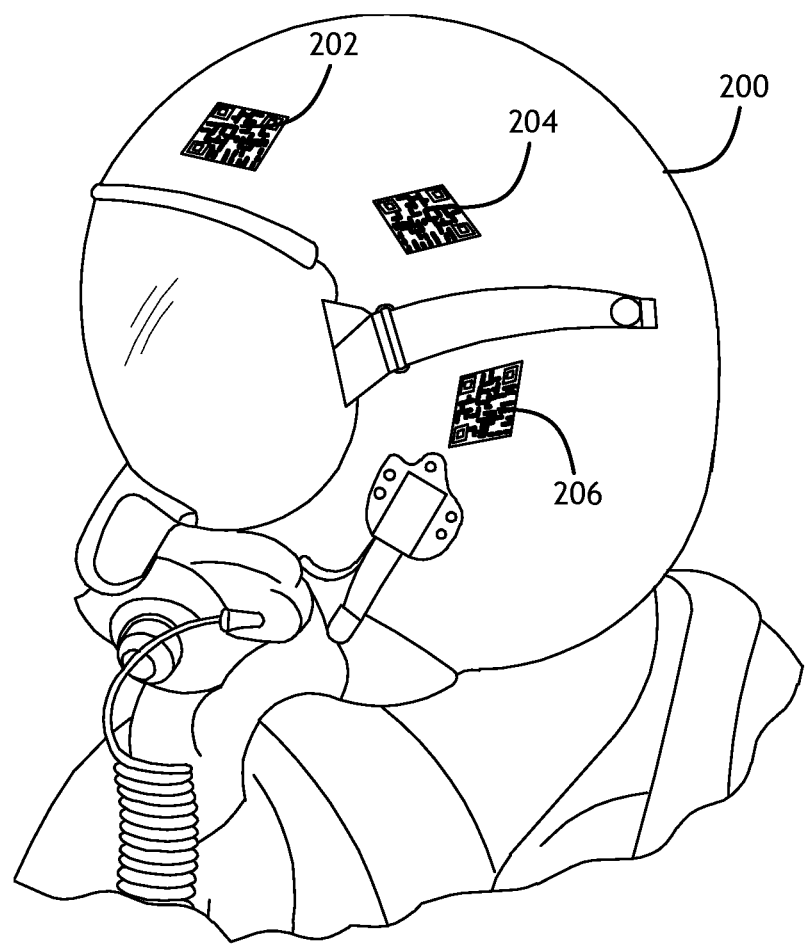
FIG. 2 shows an environmental view of a helmet including fiducials with dimensional features according to an exemplary embodiment of the inventive concepts disclosed herein.

Referring to FIG. 2, an environmental view of a helmet 200 including fiducials 202, 204, 206 with dimensional features according to an exemplary embodiment of the inventive concepts disclosed herein is shown. In at least one embodiment, where the helmet 200 is intended for use in a head tracking system, the fiducials 202, 204, 206 are each disposed at defined locations on the helmet, and with defined orientations. Because the fiducials 202, 204, 206 include coded features, the identity each fiducials 202, 204, 206, and their specific locations and orientations are a critical factor.

Figure 3:
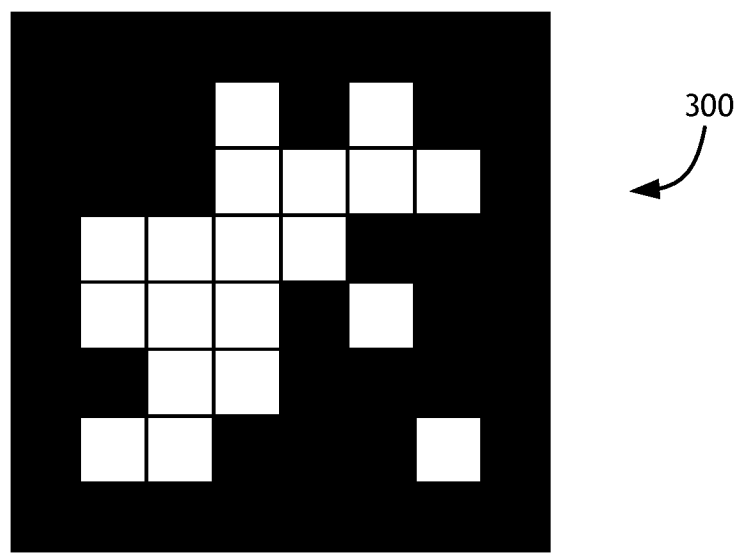
FIG. 3 shows fiducials with dimensional features according to exemplary embodiments of the inventive concepts disclosed herein.
Figure 3:

Referring to FIG. 3, fiducials 300, 302 with dimensional features according to exemplary embodiments of the inventive concepts disclosed herein is shown. In at least one embodiment, an ArUco based fiducial 300 may be used; in another embodiment, a quick response (QR) code fiducial 302 may be used. Such fiducials 300, 302 have dimensional features that allow them to function as more than simple point sources. The $i^{th}$ fiducial ID $m_i$ as a N-bit integer:

$$m = [m_i[1]m_i[2] \ldots m_i[N]] \in B^N$$

where $m_i[N]$ is the $n^{th}$ bit of the fiducial ID, and $B^N$ is the set of N-bit integers. The set of fiducial IDs in the constellation is:

$$C = \{m_1, m_2, \ldots m_i\} \subset B^N$$

For a single fiducial ID estimation, performed by detecting the fiducial in an image and decoding the information, the true fiducial ID be $m_1$ and the estimated fiducial ID be $m_{est} \in B^N$.

A "correspondence integrity event" (CIE) is the algorithm estimating a fiducial ID $m_{est}$ that is not equal to the true fiducial ID $m_1$ without flagging the fiducial ID as erroneous. CIE will be avoided when the algorithm: correctly identifies the fiducial, fails to detect/decode a fiducial, or identifies the fiducial ID as invalid.

The correspondence integrity problem may then be stated to estimate an overbound of the probability of CIE:

$$P_{CIE} \geq Pr(m_{est} \neq m_{true})$$

A simple solution to correspondence integrity is to use only one fiducial, giving $P_{CIE}=0$. While this provides correspondence integrity, it provides no accuracy, integrity, or availability advantages of multiple measurements.

Since the algorithm can verify that the fiducial ID estimate is in the list of known fiducial IDs in the constellation (determined during mapping), CIE will only occur when:

$$m_{true} \neq m_{est}$$

$$m_{est} \in C$$

The correspondence integrity problem may then be refined to $$P_{CIE} \geq Pr(m_{est} \neq m_{true}, m_{est} \in C)$$

That is, the estimated fiducial ID is not equal to the true fiducial ID, but the estimated fiducial ID is a valid ID in the constellation, so it cannot be identified as an invalid ID.

Conceptually, any fiducial ID estimate $m_{est} \in B^N$ that is "close" (or similar) to $m_1$ is much more likely than one that is "far" from $m_1$. Since these close fiducials are much more likely to be the estimated fiducial ID than uniformly randomly sampling $B^N$, this means that there are also "far" fiducials, where the probability is lower than uniformly random. Assuming a suitable distance metric $p(m_i, m_j)$, for some distance R the probability will drop below uniformly random probability $P_{rand}$:

$$Pr(m_{est}|p(m_1, m_{est}) > R) < P_{rand}$$

Also assuming all fiducial IDs are spaced at a distance greater than R:

$$p(m_i, m_j) > R \forall i \neq j$$

Then:

$$P_{CIE} = Pr(m_{est} \neq m_{true}, m_{est} \in C) < P_{rand} = (I-1)\frac{1}{2^N}$$

Solving for the number of bits:

$$N = \text{ceil}\left[\log_2\left(\frac{I-1}{P_{CIE}}\right)\right]$$

In one exemplary embodiment, where a system comprises eleven fiducials and $P_{CIE}=10^{-7}$:

$$N = \text{ceil}\left[\log_2\left(\frac{10}{10^{-7}}\right)\right] = 27 \text{ bits}$$

The smallest QR code fiducial (such as the QR code fiducial 302, though not representative of size), has 21×21 modules and can store 41 decimal characters (136 bits) with level L error correction (7%). Therefore a QR code fiducial 302 easily satisfies this CIE requirement, with many extra bits for increasing the distance between fiducials.

This CIE requirement may also be satisfied using a Micro QR code, which supports ten numerals (33 bits). Micro QR codes allow for 1.6 times the number of pixels per module for the same fiducial width. The CIE requirement may also be met using a 6×6 ArUco fiducial 300. The lower fiducial density tends to provide better availability.

This calculation is conservative in that it doesn't take account of how many bit flips actually need to occur to have CIE; most fiducial IDs will be much less likely to be the estimated than pure random.

After selecting a fiducial type with enough bits, the next requirement is selecting a good set of fiducial IDs. First define a distance function p and a radius R outside which fiducial IDs are less likely than random. In practice, we only need to define a methodology to select well-spaced fiducials. One distance metric commonly used for sets of binary sequences is Hamming distance, the minimum number of bit flips required to convert one set member to another set member. The issue with Hamming distance for spatially coded fiducials is that it neglects the spatial correlation of bit flips. In one embodiment, fiducial sets are defined via a method to characterize how much of a difference between two fiducials can be generated using common-mode bit-flip failures versus requiring random bit flip failures. Possible causes of common-mode bit flips include, but are not limited to:

illumination/shadow;
lens/sensor localized effects;
fiducial perspective/rotation/reflections; and
systematic errors in detect/decode algorithms.

Suitable criteria for selecting fiducial IDs with large inter-fiducial distances include:

Hamming distance between fiducials, invariant to rotation or reflection;
fiducial self-distance under rotation and reflection;
number of bit transitions in a row (high spatial frequency reduces the likelihood of spatially correlated bit flips causing an integrity event); and
number of times a row appears in the constellation.

While exemplary fiducials described here include ArUco based fiducials 300 and QR code fiducials 302, any fiducials may be used provided they include features with sufficient data density to allow each fiducial to be uniquely identified and allow the orientation of the fiducial to be determined, and sufficient environmental distinction to minimize environmental interference.

Figure 4A:
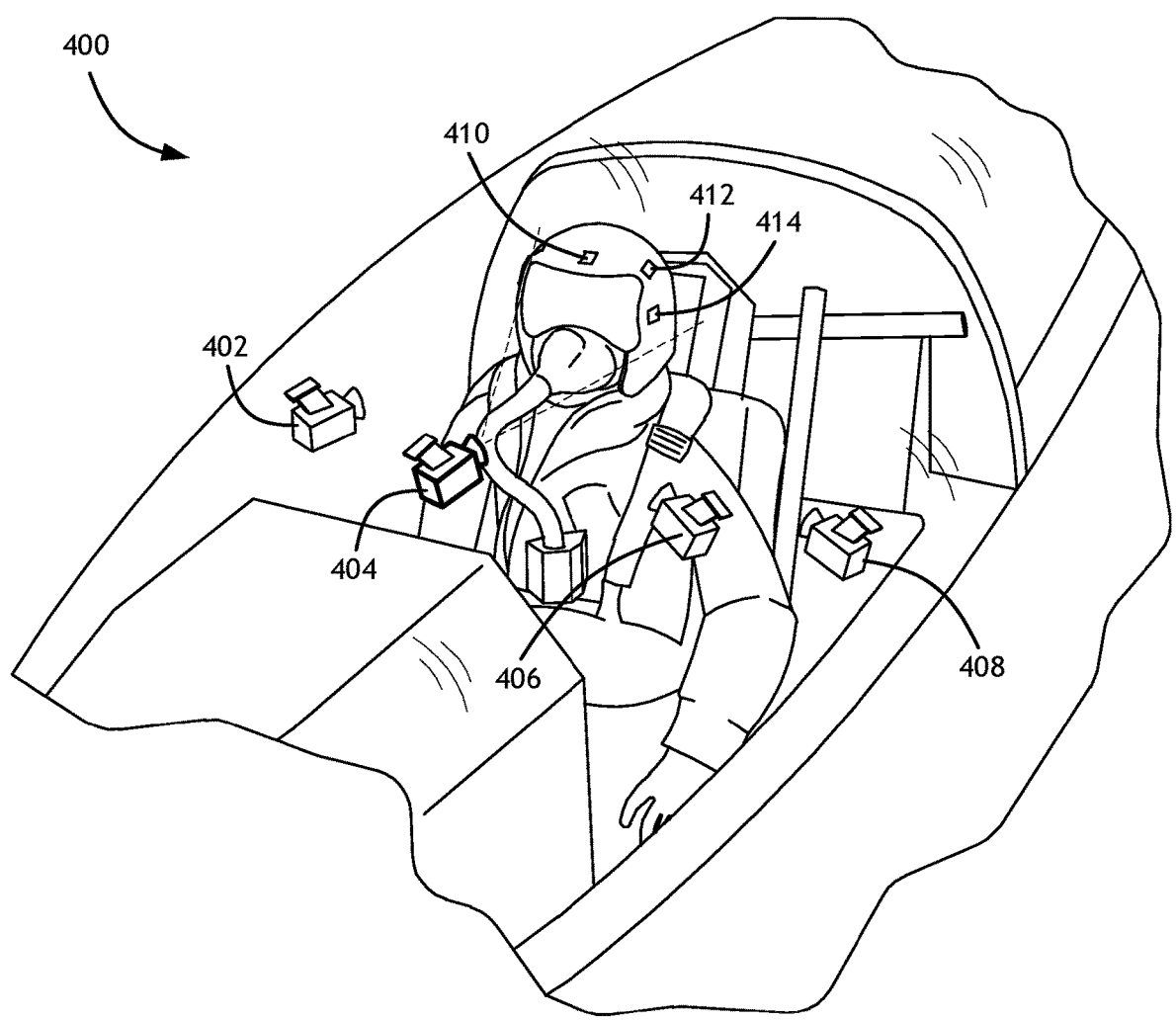
FIG. 4A shows an environmental view of an aircraft cockpit including an exemplary embodiment of the inventive concepts disclosed herein.
Figure 4B:
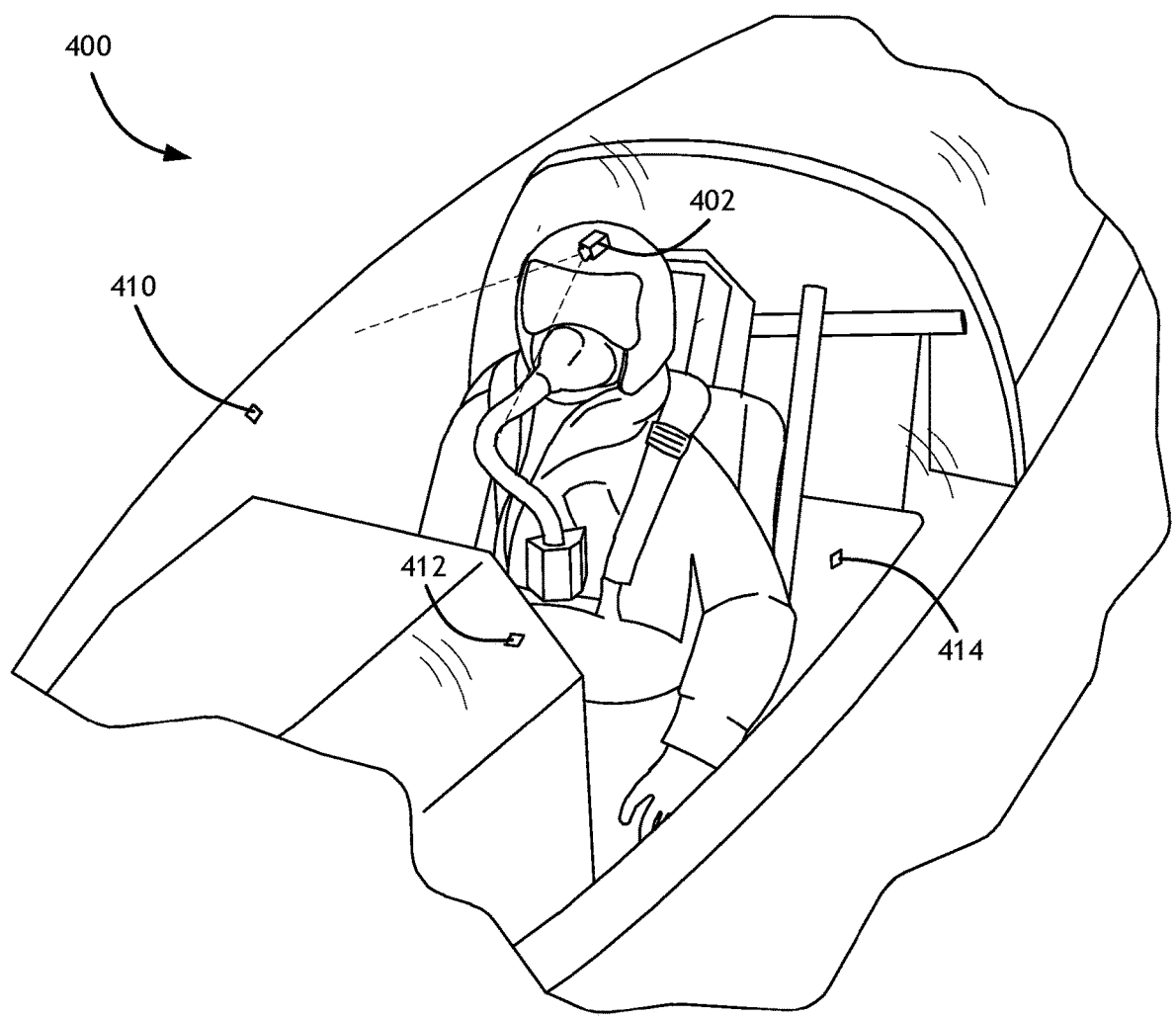
FIG. 4B shows an environmental view of an aircraft cockpit including an exemplary embodiment of the inventive concepts disclosed herein.
Figure 4C:
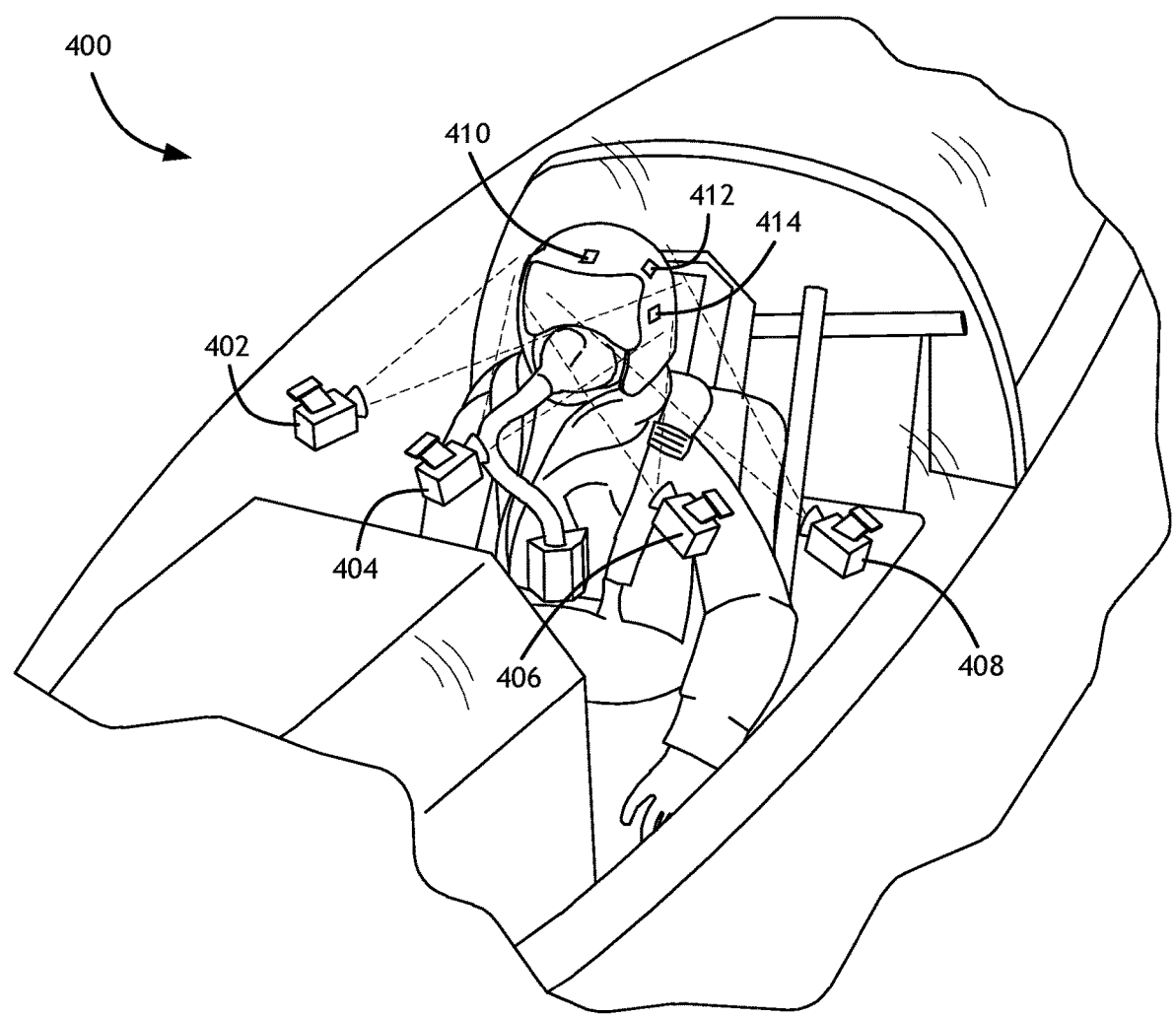
FIG. 4C shows an environmental view of an aircraft cockpit including an exemplary embodiment of the inventive concepts disclosed herein.

Referring to FIGS. 4A, 4B, and 4C, environmental views of an aircraft cockpit 400 including exemplary embodiments of the inventive concepts disclosed herein are shown. The aircraft cockpit 400 includes one or more cameras 402, 404, 406, 408 and a plurality of fiducials 410, 412, 414, each having coded features to distinctly identify each fiducial 410, 412, 414 and define its orientation. In at least one embodiment (such as in FIG. 4A) a single camera 404 may image all of the fiducials 410, 412, 414 within a field of view. In at least one alternative embodiment (such as in FIG. 4B) multiple cameras 402, 404, 406, 408 may be disposed to capture images from distinct locations and produce multiple head pose estimates as more fully defined herein.

While FIGS. 4A and 4B show the plurality of fiducials 410, 412, 414 disposed on a helmet and the one or more cameras 402, 404, 406, 408 disposed on surfaces of the cockpit 400, alternative embodiments (such as in FIG. 4C) may include cameras disposed on a helmet and the fiducials disposed within the cockpit. Many of the mathematical operations described here are based on helmet mounted cameras 402 and cockpit disposed fiducials 410, 412, 414. A person skilled in the art will appreciate that certain modifications to the mathematical operations are necessary to account for the change in reference frame.

Figure 5:
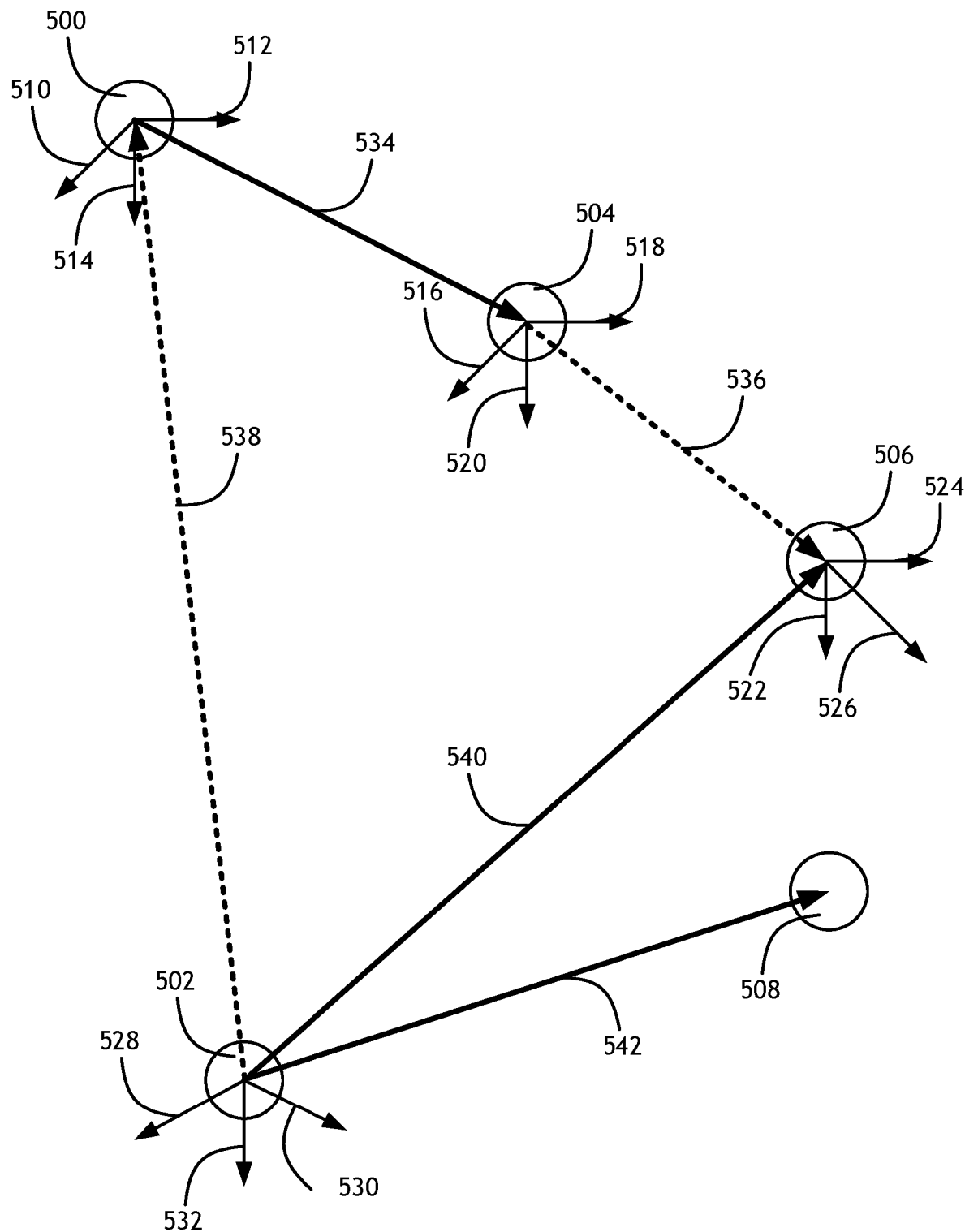
FIG. 5 shows a block diagram representation of various frames of reference used to calculate a head pose according to exemplary embodiments of the inventive concepts disclosed herein.

Referring to FIG. 5, a block diagram representation of various frames of reference used to calculate a head pose according to exemplary embodiments of the inventive concepts disclosed herein is shown. In head tracking in a mobile environment, a head tracking system determines the position and orientation of a "head" frame 500 (generally references by h herein) with respect to a "platform" frame 502 (generally references by p herein). The platform frame 502 may be a vehicle interior such as a cockpit.

In at least one embodiment, a camera is fixed to the head frame 500 and defines a "camera" frame 504. The camera measures fiducials, each within a "fiducial" frame 506, 508 via pixel coordinates within the captured images. An expected pixel location may be computed based on the known fiducial location, the intrinsic properties of the camera, the extrinsic properties of the rigid head-camera relative position and orientation 534, and the pose estimate of the head relative to the platform. The observed residual between the measured fiducial location and the expected fiducial location may be used to estimate the head pose. Pose estimation may be performed using a snapshot approach, loosely coupled optical-inertial, or tightly coupled optical inertial.

In at least one embodiment, the platform frame 502 is a reference frame that describes the location of objects in a vehicle such as an aircraft, and is rigidly mounted to the aircraft. In general, it may be a fixed translation ($\phi$) and rotation (r) from the aircraft body. The platform frame 502 may be defined consistent with SAE body frame with a forward/backward dimension (X) 530, a right/left dimension (Y) 528, and a down/up dimension (Z) 532. For convenience, the origin of the platform frame 502 may be selected at a "nominal" pilot head location such that a nominal head pose is intuitively all zeros.

The head frame 500 is a reference frame that is rigidly attached to (or rigidly conforms to) a head-worn device being tracked. The pose estimation problem determines the pose of the head with respect to the platform.

The camera frame 504 may be rigidly attached to the head-worn device, with fixed translation and rotation based on the head frame 500 via the rigid head-camera relative position and orientation 534. The camera frame 504 may be defined with the origin at the camera focal point and the X dimension 518 along a camera optical axis, with the Y dimension 516 and Z dimension 520 translated accordingly. The camera may be rigidly mounted to the aircraft while the head-worn device is rigidly mounted to the head.

Each of a plurality of fiducials 506, 508 comprises an artifice with dimensional features such as a QR code which are planar and not singular points. Such fiducials 506, 508 may be located at a fixed positions and orientations 540, 542 within the platform frame 502.

In at least one embodiment, the relative positions and orientations 540, 542 of the fiducials 506, 508 with respect to the platform frame 502, and the rigid head-camera relative position and orientation 534 of the camera frame 504 with respect to the head frame 500 are fixed such that, for the purposes of estimation calculations set forth herein, translation ($\phi$) and rotation (r) associated with those relationships are invariant. Furthermore, the position and orientation 536 of the camera frame 504 with respect to each fiducial 506, 508 and the position and orientation 538 of the head frame 500 with respect to the platform frame 502 may vary over time and may be mathematically related to the fixed positions and orientations 534, 540, 542, and the X dimensions 512, 518, 524, 530, Y dimensions 510, 516, 522, 528, and Z dimensions 514, 520, 526, 532 of the respective frames 500, 503, 504 and fiducials 506, 508. It will be appreciated that all of the principles and methodologies described herein are applicable to embodiments where other of the position and orientation relationships 534, 536, 538, 540, 542 are fixed.

In at least one embodiment, a linear camera calibration matrix is used:

$$K = \begin{bmatrix} \alpha_x & s & x_0 \\ 0 & \alpha_y & y_0 \\ 0 & 0 & 1 \end{bmatrix}$$

With parameters determined during intrinsic camera calibration. Additional calibration may be performed to correct for radial and tangential distortion. Assuming a linear camera, or alternatively that nonlinear effects have been compensated for, the perspective projection may then be defined as:

$$\begin{bmatrix} v_x \\ v_y \\ v_z \end{bmatrix} = \begin{bmatrix} \alpha_x & s & x_0 \\ 0 & \alpha_y & y_0 \\ 0 & 0 & 1 \end{bmatrix} \begin{bmatrix} x_{cv} \\ y_{cv} \\ z_{cv} \end{bmatrix}$$

$$y = K x_{m/c}^{cv}$$

$$p = \begin{bmatrix} y(1)/y(3) \\ y(2)/y(3) \end{bmatrix}$$

where $x_{m/c}^{cv}$ is the 3D location of a fiducial 506, 508 with respect to the camera frame 504, expressed in computer vision (cv) coordinates, and p is the corresponding pixel location of that fiducial 506, 508. Computer vision (cv) coordinates are defined to be consistent with computer vision conventions, and are centered at the focal point, with Z dimension 526 along the optical axis, the X dimension 524 to the right, and the Y dimension 522 down. Alternative orientations may necessitate an interim transformation of one or more dimensions. Pixel coordinates are typically expressed with positive X 524 as right and positive Y 522 as down. The center of the upper left pixel is either (1,1) (consistent with MATLAB) or (0,0) (consistent with OpenCV and OpenGL). When switching from a 1-based system to a 0-based system, $x_0$ and $y_0$ must both be reduced by 1. If the actual camera is nonlinear, a nonlinear mapping may also be applied.

A Jacobian matrix of y with respect to intrinsic errors a may be determined by:

$$y = \begin{bmatrix} \alpha_x x_{cv} + s y_{cv} + x_0 z_{cv} \\ \alpha_y y_{cv} + y_0 z_{cv} \\ z_{cv} \end{bmatrix} = \begin{bmatrix} x_{cv} & 0 & y_{cv} & z_{cv} & 0 \\ 0 & y_{cv} & 0 & 0 & z_{cv} \\ 0 & 0 & 0 & 0 & 0 \end{bmatrix} \begin{bmatrix} \alpha_x \\ \alpha_y \\ s \\ x_0 \\ y_0 \end{bmatrix} +$$

$$\begin{bmatrix} 0 \\ 0 \\ z_{cv} \end{bmatrix} = J_I x_I \begin{bmatrix} 0 \\ 0 \\ z_{cv} \end{bmatrix}$$

Then using:

$$M = \frac{1}{(e_3 \hat{y})^2}((e_3 \hat{y})e_{12} - (e_{12} \hat{y})e_3)$$

It can be determined:

$$H_I = M J_I$$

Given an initial pose estimate, a processor may compute a more accurate pose estimate using nonlinear optimization to minimize reprojection errors. The search parameters for the optimization may be four quaternion states and three position states. If quaternions are used, an additional constraint is required on the quaternion norm. Alternatively, three Euler angles may be used to define a rotation from the coarse pose estimate.

Where $\hat{K}$ is an estimated camera calibration matrix, $r_{m/p}^p$ is an estimated fiducial location in in the platform frame 502, $r_{h/p}^p$ is an estimated head position in the platform frame 502, $r_{c/h}^h$ is an estimated camera position in the head frame 500, $C_h^c$ is an estimated DCM from the head frame 500 to the camera frame 502, $c_p^h$ is an estimated DCM from the platform frame 502 to the head frame 500, $C_c^{cv}$ is a constant representing a DCM from the camera frame 504 to a computer visions frame comprising the sparse matrix $$\begin{bmatrix} 0 & 1 & 0 \\ 0 & 0 & 1 \\ 1 & 0 & 0 \end{bmatrix},$$

$e_{12}$ the constant matrix $$\begin{bmatrix} 1 & 0 & 0 \\ 0 & 1 & 0 \end{bmatrix},$$

and $e_3$ the constant matrix [0 0 1]; a tightly coupled measurement update is performed in the camera frame 504 to make use of a perspective camera matrix P, known in a variety of computer vision applications. A perspective transformation $x = P \hat{x}^p$ being equivalent to:

$$y = K C_p^c [I_3 \mid -r_{c/p}^p][r_{m/p}^p 1]^T$$

$$p = \frac{e_{12} y}{e_3 y}$$

$$r_{c/p} = r_{c/m} + r_{m/p} = r_{c/h} + r_{h/p}$$

$$r_{c/p} = -r_{m/p} + r_{c/h} + r_{h/p}$$

The pixel location p of a fiducial m 506, 508 in an image is determined by the fiducial position and orientation 536 with respect to the camera frame 504 and the intrinsic calibration matrix K. The fiducial position and orientation 536 relative to the camera may be expressed with respect to the camera frame 504 as the difference between the fiducial position and the camera position, and be expanded to include the terms of the head position and the extrinsic calibration offset represented by the rigid head-camera relative position and orientation 534.

Expanding $x = P\hat{X}^p$ according to these quantities:

$$\tilde{p} = p + \delta\tilde{p}$$

$$\hat{p} = \frac{e_{12}\hat{y}}{e_3\hat{y}}$$

$$y = KC_h^c(C_p^h(r_{m/p}^p - r_{h/p}^p) - r_{c/h}^h) =$$
$$KC_h^cC_p^h(r_{m/p}^p - r_{c/h}^p - r_{h/p}^p) = KC_h^cC_p^h[I_3 \mid -(r_{c/h}^p + r_{h/p}^p)][r_{m/p}^p 1]^T$$

Then expanding the expression for $\hat{p}$ using error models, a first order approximation, and assuming all errors are uncorrelated:

$$\hat{y} \approx \hat{K}\hat{C}_h^c(I - [\delta b\times])\hat{C}_p^c(I - [\phi\times])(r_{m,p}^P + \delta r_{m/p}^P - r_{h/p}^p - \delta r_{h/p}^P)$$

$$-\hat{K}\hat{C}_h^c(I - [\delta b\times])(r_{c,h}^h - \delta r_{c/h}^h)$$

$$\approx \hat{K}\hat{C}_h^c\hat{C}_p^h(r_{m,p}^P - \hat{C}_p^h r_{c/h}^h - r_{h/p}^P) - \hat{K}\hat{C}_h^c\hat{C}_p^h[(r_{m/p}^P - r_{h/p}^p)\times]\phi - \hat{K}\hat{C}_h^c\hat{C}_p^h\delta r_{h/p}^P$$

$$+\hat{K}\hat{C}_h^c\hat{C}_p^h\delta r_{m/p}^P + (\hat{K}\hat{C}_h^c\hat{C}_p^h[(r_{m/p}^P - r_{h/p}^P)\times] - \hat{K}\hat{C}_h^c[r_{c/h}^h\times])\delta b - \hat{K}\hat{C}_h^c\delta r_{c/h}^h$$

$$\hat{y} \approx y + J_\phi\phi + J_{\delta b}\delta b + J_{\delta r_{c/h}^h}\delta r_{c/h}^h + J_{\delta r_{h/p}^P}\delta r_{h/p}^P + J_{\delta r_{m/p}^P}\delta r_{m/p}^P$$

$$\hat{p} \approx p + H_\phi\phi + H_{\delta b}\delta b + H_{\delta r_{c/h}^h}\delta r_{c/h}^h + H_{\delta r_{h/p}^P}\delta r_{h/p}^P + H_{\delta r_{m/p}^P}\delta r_{m/p}^P$$

The residual z in terms of image pixels is given by:

$$z = \tilde{p} - \hat{p} = \delta\tilde{p} - H_\phi\phi - H_{\delta b}\delta b - H_{\delta r_{c/h}^h}\delta r_{c/h}^h - H_{\delta r_{h/p}^P}\delta r_{h/p}^P$$

$$H_\phi = \frac{\partial}{\partial \phi}p = \frac{1}{(e_3\hat{y})^2}\left(e_3\hat{y}\frac{\partial(e_{12}\hat{y})}{\partial\phi} - (e_{12}\hat{y})\frac{\partial(e_3\hat{y})}{\partial\phi}\right) =$$

$$\frac{1}{(e_3\hat{y})^2}((e_3\hat{y})e_{12}J_\phi - (e_{12}\hat{y})e_3 J_\phi) = -MKC_h^cC_p^h[(r_{m/p}^P - r_{h/p}^P)\times]$$

$$H_{\delta r_{c/h}^h} = -MKC_h^c$$

$$H_{\delta r_{h/p}^P} = -MKC_h^cC_p^h$$

$$H_{\delta b} = M(KC_h^cC_p^h[(r_{m/p}^P - r_{h/p}^P)\times] - KC_h^c[r_{c/h}^h\times])$$

$$H_{\delta r_{m/p}^P} = MKC_h^cC_p^h$$

$$M = \frac{1}{(e_3\hat{y})^2}((e_3\hat{y})e_{12} - (e_{12}\hat{y})e_3)$$

A complete measurement update is defined by:

$$x = [\delta\hat{r}_{h/p}^P \delta\hat{v}_{h/p}^P \delta\hat{a}_{b/h} \hat{\phi} \delta\hat{\omega}_{b/h} \delta\hat{b}]^T$$

$$H = [H_{\delta r_{h/p}^P} 0_3 0_3 H_\phi 0_3 H_{\delta b}]$$

$$R = \Sigma_{n_{\tilde{p}\tilde{p}}^T} = \Sigma_{\delta\tilde{p}} + H_{\delta r_{c/h}^h}\Sigma_{\delta r_{c/h}^h}H_{\delta r_{c/h}^h}^T + H_{\delta r_{m/p}^P}\Sigma_{\delta r_{m/p}^P}H_{\delta r_{m/p}^P}$$

In at least one embodiment, the covariance $\Sigma_{\eta_z}$ between two jointly distributed real-valued random variables X and Y with finite second moments is defined by:

$$\Sigma_{\eta_z} = E[(\eta_z - E[\eta_z])(\eta_z - E[\eta_z])^T] = E[\eta_z\eta_z^T] - E[\eta_z]E[\eta_z]^T$$

It is necessary to verify the sign of all linearized measurement models (i.e. Jacobian matrices). To verify the sign, inject bias errors in each vector quantity independently and verify the change in the residual $\delta\hat{r}_{h/p}^P$, $\delta\hat{v}_{h/p}^P$, $\delta\hat{a}_{b/h}$, $\hat{\phi}$, $\delta\hat{\omega}_{b/h}$, $\delta\tilde{p}$, $\delta r_{c/h}^h$, $\delta r_{m/p}^P$, and $r_{m/p}^P$. To verify the calculation of the measurement residual covariance calculation it is necessary to perform a series of Monte Carlo analyses at discrete operating points (i.e. different poses) and injecting random errors into the same error terms and compute the statistics (i.e. mean and variance) of the calculated residual and compare that to the expected value using linearized measurement models. Alternatively, or in addition, Jacobian matrices may be computed via Monte Carlo simulation instead of analytically.

The linearized measurement equation for the $i^{th}$ pixel measurement is:

$$z[i] = H_H[i]x_H + H_E[i]x_E + H_I[i]x_I + H_M[i]x_M[i] + e_P[i]$$

where:

$$z[i] \in \Re^{2\times 1} = \tilde{p} - \hat{p}$$

$$x_H \in \Re^{6\times 1} = [(\delta r_{h/p}^P)^T\phi^T]^T$$

$$x_E \in \Re^{6\times 1} = [(\delta r_{c/h}^h)^T\delta b^T]^T$$

$$x_I \in \Re^{5\times 1}$$

$$x_M[i] \in \Re^{3\times 1} = \delta r_{m/p}^P$$

$$e_P[i] \in \Re^{2\times 1} = \delta\tilde{p}$$

Assuming head pose estimate x, and including extrinsic factors, intrinsic factors, fiducial mapping, and pixel errors as error sources e; terms may be group according to:

$$x = x_H$$

$$H[i] = H_H[i]$$

$$e[i] = H_E[i]x_E + H_I[i]x_I + H_M[i]x_M[i] + e_P[i]$$

The linearized measurement equation for the $i^{th}$ measurement may be written in a standard form:

$$z[i] = H[i]x + e[i], \text{var}[e[i]] = R[i]$$

With N point measurements, a full unfaulted ($H_O$) snapshot measurement equation can be constructed:

$$\begin{bmatrix} z[1] \\ z[2] \\ \vdots \\ z[N] \end{bmatrix} = \begin{bmatrix} H[1] \\ H[2] \\ \vdots \\ H[N] \end{bmatrix} x + \begin{bmatrix} e[1] \\ e[2] \\ \vdots \\ e[N] \end{bmatrix}$$

$$H_O: z = Hx + e, \text{var}[e] = R E[e] = 0$$

Assuming upstream checks have ensured $N \geq N_{min} \geq 3$, $H \in \Re^{2N\times 6}$ is likely rank 6, unless a degenerate geometry is present. An alternative normalized version of the measurement equation may be defined by multiplying the measurement equation by $R^{-1/2}$, yielding the substitutions:

$$\bar{z} = R^{-1/2}z$$

$$\bar{e} = R^{-1/2}e$$

$$\bar{H} = R^{-1/2}H$$

producing a normalized measurement equation:

$$H_O: \bar{z} = \bar{H}x + \bar{e}, \text{var}[\bar{e}] = I_{2N} E[\bar{e}] = 0$$

For convenience, the over-bars may be dropped in sections using normalized coordinates. When mixing normalized and unnormalized terms, the overbars should be used for clarity and unless otherwise stated, the unnormalized measurement equation should be assumed.

When determining measurement covariance:

$$\text{var}[e[i]] = R[i]$$

$$e[i] = H_E[i]x_E + H_I[i]x_I + H_M[i]x_M[i] + e_P[i]$$

Assume:

$$\text{var}[x_E] = R_E$$

$$\text{var}[x_I] = R_I$$

$$\text{cov}[x_M[i], x_M[j]] = \begin{cases} R_M[i] & i = j \\ 0 & \text{otherwise} \end{cases}$$

$$\text{cov}[e_P[i], e_P[j]] = \begin{cases} R_P[i] & i = j \\ 0 & \text{otherwise} \end{cases}$$

Additionally, assuming there is no correlation between intrinsic, extrinsic, fiducial, and pixel error vectors, the covariance may be defined by:

$$R[e[i], e[j]] =$$

$$\begin{cases} H_E[i]R_E H_E^T[i] + H_I[i]R_I H_I^T[i] + H_M[i]R_M H_M^T[i] + R_P[i], & i = j \\ H_E[i]R_E H_E^T[i] + H_I[j]R_I H_I^T[j], & \text{otherwise} \end{cases}$$

The covariance for the complete snapshot measurement equation is $$R = \begin{bmatrix} R[1,1] & R[1,2] & \cdots & R[1,N] \\ R[2,1] & R[2,2] & \cdots & R[2,N] \\ \vdots & \vdots & \ddots & \vdots \\ R[N,1] & R[N,2] & \cdots & R[N,N] \end{bmatrix}$$

The weighted least squares estimate with weighting matrix W minimizes:

$$J = (z - H\hat{x})^T W (z - H\hat{x})$$

The weighting matrix is typically positive-definite and either selected to be $R^{-1}$ (maximum likelihood) or I (least squares). For the maximum likelihood estimate, the weighted least squares estimate is defined by:

$$\hat{x} = (H^T R^{-1} H)^{-1} H^T R^{-1} z$$

Since $P_{inv} = H^T R^{-1} H$ should be a symmetric positive definite matrix, a Cholesky inverse procedure may be applied to guard against ill-conditioning and numerical issues. If the Cholesky inverse fails checks for division by zero or taking the square root of a negative number, the least squares estimate (and the properties derived from it) should be marked invalid. The covariance of the weighted least squares estimate is:

$$P = \text{var}[\hat{x}] = (H^T R^{-1} H)^{-1}$$

In general, snapshot pose estimation will yield a unique solution when $P_{inv}$ is full-rank. This is ensured by the checks performed during the Cholesky inverse. The snapshot pose will be practically unobservable in the presence of noise when $P_{inv}$ is ill-conditioned. This low observability, and other insights, are illustrated by considering the singular value decomposition of the measurement matrix. Taking the singular value decomposition of the measurement equation yields:

$$H = USV^T = U_1 S_1 V_1^T$$

where $S \in \Re^{2N \times 6}$ is a rectangular matrix with the singular values on the diagonal, while $U \in \Re^{2N \times 2N}$ and $V \in \Re^{6 \times 6}$ contain the corresponding left and right singular column vectors. The $S_1$ matrix is square with the non-zero singular values on the diagonal, while $U_1$ and $V_1$ contain the associated singular column vectors. The singular vectors corresponding to the zero singular values are similarly denoted $U_0$ and $V_0$. The number of non-zero singular values is the rank of H. These matrices have certain practical meanings in the least squares estimate:

$U_1$ columns form a basis for a "modeled space" (or range) of H, that is measurement vectors that could be described by the linear model $H_x$ for some value of x;

$U_0$ columns form a basis for an "error space" of H, that is measurement vectors that cannot be achieved by the linear model $H_x$ for any value of x;

$V_0$ columns form a basis for the null space of H, that is the subspace of x that produces a zero measurement; and $V_1$ columns form a basis for the "productive space" of H, that is the subspace of x that produces a non-zero measurement.

The estimate and residuals may be written in terms of the singular value decomposition:

$$\hat{x} = V_1 S_1^{-1} U_1^T z = H^\dagger z$$

$$\hat{z} = H\hat{x} = U_1 U_1^T z = P_M z$$

$$r = (I - U_1 U_1^T) z = (U_0 U_0^T) z = (I - P_M) z = P_E z$$

where $P_M$ is a projection of z onto the modeled space, while $P_E$ is a projection onto the error space. Several key points about the least squares estimate are illustrated by these equations:

the estimate $\hat{x}$ can only be in the productive space;

when computing $\hat{x}$, the measurement vector is projected into the modeled space, meaning that noise/bias in the error space will have no effect on the estimate but will add noise/bias in the residuals; and conversely, any noise/bias in the modeled space will cause noise/bias in the state estimate and will leave no residual to indicate an increased error.

The state estimate can be expressed using right singular vectors as a basis, making the link between small singular values and observability clear:

$$\hat{x} = V\alpha$$

$$\text{var}[\hat{x}] = V(S^T S)^{-1} V^T$$

$$\text{var}[\alpha] = (S^T S)^{-1}$$

Small singular values will lead to a large variance in the state estimate along the associated right singular vectors. These right singular vectors define an almost null space of H, and indicate a subspace where the state vector has poor observability. In the case of poor observability there may be some value in reformulating the snapshot pose estimation problem to eliminate state ambiguities. For example, lateral shifts may become indistinguishable from yaw in some geometries. In these cases, better performance may be possible by estimating attitude/heading and assuming the position is at a nominal head location.

After performing weighted least squares, measurement residuals may be formed as:

$$r = z - H\hat{x}$$

The sum of square residuals normalized by covariance follows a Chi-square distribution with 2N−6 degrees of freedom.

$$T = r^T R^{-1} r \overset{H_0}{\sim} \chi_{2N-6}^2$$

where T is our Chi-square test statistic, $\overset{H_0}{\sim}$ indicates the distribution under the fault-free null hypothesis, $H_0$. In this context, fault-free means that the measurements follow the measurement model defined above with mean-zero errors.

Fault detection tests that the measurements are consistent with the fault-free $H_0$ hypothesis. Given that the measurement model is correct, the test statistic will follow a Chi-square distribution. If the measurement model is optimistic, the test statistic will tend to be larger than predicted. To detect faults, set a threshold such that when a test statistic is larger than expected, the test if flagged as failed. Because the Chi-square distribution goes to infinity, even if the measurement models are fault-free, there is always some probability that the test statistic will randomly be larger than the threshold. This is called the false-positive rate (FPR). Design tradeoffs for FPR requires a threshold $T_{max}$ that satisfies:

$$Pr[T > T_{max}] = FPR$$

For implementation, $T_{max}(N)$ can be computed offline for varying N and stored as a table.

The exact formulation of the protection levels (PLs) should be driven by requirements and/or best practices. Under the $H_0$ hypothesis, the weighted least square state estimate $\hat{x}$ is distributed as:

$$\delta x = \hat{x} - x \overset{H_0}{\sim} N(0, P)$$

where P is full rank. Standard deviations may be computed as:

$$[(\sigma_x, \sigma_y, \sigma_z, \sigma_\phi, \sigma_\theta, \sigma_\psi)] = diag[P]$$

These 1D sigma values may be multiplied by a Gaussian "K-factor" to establish 1D bounds with a desired probability of exceedance. The two-tailed K-factor may be computed from a Gaussian distribution. For example, K-factors for 5% and $10^{-7}$ are 1.96 and 5.33, respectively. This probability of exceedance only applies to the rate at which an individual axis (dimension) exceeds confidence interval bounds. The probability of any axis exceeding bounds will be higher, unless the axes are fully correlated. Conservatively, assuming each axis was independent, the overall confidence interval group failure rate is:

$$\alpha_{total} = 1 - (1-\alpha)^{df} = \alpha df - \binom{df}{2}\alpha^2 + \ldots$$

where df is the number of 1D axes, or degrees-of-freedom (DOF), to be bound. When a is small, the overall failure rate is well approximated by the sum of the individual failure rates. The single-axis failure rate could be adjusted to provide an overall failure rate:

$$\alpha_{adjusted} = 1 - (1 - \alpha_{total}^{desired})^{1/df}$$

For example, applying a 5% per-axis failure rate for all 6 DOF would yield an overall failure rate of 26%. To achieve a 95% bound using this approach, a 99% per-axis bound is required.

The single axis method does not account for correlation in the axes, which reduces the overall failure rate. Also, single axis error bounds are most useful when certain axes are important. To account for correlation using a multivariate approach, Chi-square approaches may be applied. Given a subset of $df_s$ axes, $x_s$, a Chi-square bound may be formulated using the covariance of that subset, $P_s$, as:

$$\delta x_s^T P_s^{-1} \delta x_s \overset{H_0}{\sim} \chi_{df_s}^2$$

$$\delta x_s^T P_s^{-1} \delta x_s < \chi_{df_s, \alpha}^2$$

This provides an ellipsoidal bound that takes into account any correlation between axes captured in the off-diagonal terms in $P_s$. Typical subsets might be horizontal position, 3D position, orientation, 6 DOF pose, etc. If multiple bounds are computed, overall a calculations still apply.

Another approach to error bounding is to assume the head pose is an intermediate output for the head-worn display (HWD). The ultimate output of the HWD is georeferenced or body referenced flight guidance cues that are rendered onto pixels of the display. Errors in head pose will cause the flight guidance points to be rendered along an incorrect line of sight, which depending on the nature of the cue and phase of flight may be hazardously misleading. Given a linear mapping between pose errors and the change in pixel location of a flight guidance cue in the display:

$$\delta p_{fg} = H_{fg} \delta x$$

an error bound may be constructed on the pixel location (or line of sight cue) as:

$$\delta p_{fg}^T (H_{fg} P H_{fg}^T)^{-1} \delta p_{fg} < \chi_{2, \alpha}^2$$

Such analysis provides error bounds assuming a fault free $H_0$ condition. In situations with fault injection, adopting methodologies analogous to receiver autonomous integrity monitoring (RAIM) techniques used in GPS theory may be useful. The unfaulted measurement model $H_0$ may be expanded to include an additive fault b as:

$$= H_f : z = Hx + e + b, var[e] = I$$

$$z = z_0 + b$$

where $H_f$ indicates an additive fault model and $z_0$ is the unfaulted measurement. Several key weighted least square and fault detection equations described herein are:

$$\hat{x} = Az = V_1 S_1^{-1} U_1^T z$$

$$\hat{z} = P_M z = U_1 U_1^T z$$

$$r = P_E z = U_0 U_0^T z$$

$$T = z^T P_E z$$

Under $H_0$, T is distributed as a Chi-square with 2N−6 degrees of freedom. The residuals must pass a fault test, where T<Tmax, for the measurement to be declared valid. The question in the faulted case is then, "How large of a fault could be present when fault detection passes?" To answer this, first note the test statistic under faulted follows a noncentral Chi-square test statistic $$T = z^T P_E z \overset{H_f}{\sim} \chi_{2N-6, \lambda}^2$$

The parameter $\lambda$ is the Chi-square non-centrality parameter, related to the mean shift by:

$$E[T]=2N-6+\lambda=E[T_0]+\lambda$$

where $E[T_0]$ is the expected value of the test stat under $H_0$. Taking the expected value of T yields:

$$E[T]=E[(z_0+b)^T P_E(z_0+b)]=E[z_0^T P_E z_0 + 2z_0^T P_E b + b^T P_E b]=E[z_0^T P_E z_0]+b^T P_E b=E[T_0]+b^T P_E b$$

giving the relation between the fault vector and the non-centrality parameter:

$$\lambda = b^T P_E b = \|P_E b\|^2$$

The residuals are inflated due to the bias projected onto the error space. Components of bias in the error space will not impact the state estimate and will increase the test statistic, leading to detection as the fault magnitude increases. Components of bias in the modeled space of H are fully absorbed into state estimate biases, making them undetectable even with large magnitudes. Most faults will have components in both the error and modeled space, causing them to be detected as magnitudes are increased, but also causing estimation biases at smaller magnitudes.

Given a desired missed detection rate (MDR), the test threshold, and the number of measurements, a critical value of the non-centrality value $\lambda_{det}$ may be computed by iteratively solving for $\lambda_{det}$ in ae MATLAB function giving a constraint on the possible fault biases:

$$\|P_E b\|^2 \le \lambda_{det} = p_{det}^2$$

For implementation, this can be precomputed offline for a range of N and stored as a table. If the bias vector can be chosen arbitrarily from $\Re^{2N}$, the magnitude of the bias is unbounded. For the problem to be bounded, b must have some component in the error space of H. Given a fault vector b, the resulting bias on the state estimate is $$\hat{x}_b = Ab$$

Under certain circumstances, fault vectors may be constrained. In one exemplary embodiment, the fault vector direction is one of k possible unit vectors:

$$b = Bu_b$$

$$u_b \in \{u_b[1], u_b[1], \ldots, u_b[k]\}$$

Allowing for a solution for the fault magnitude and the associated state bias for the $k^{th}$ possible unit vector:

$$B[k] = \frac{p_{det}}{\|P_E u_b[k]\|}$$

$$\hat{x}_b[k] = Au_b[k]B[k]$$

The state estimate bias may be computed for all k unit vectors and worst-case values used for a conservative bias PL. If the denominator is zero, then the problem is unbounded.

Such methodology is used in GPS RAIM, where the bias unit vectors are columns of the identity matrix (indicating a single channel pseudo-range fault) and the worst-case horizontal and vertical biases are used for bias PLs. This approach might be useful for some faults on the head-tracker application, but it is expected that most faults would be at least 2D (pixels) or 3D (fiducials), requiring subspace methods.

In one exemplary embodiment, the fault bias can be selected from a subspace of $\Re^{2N}$, which may be described as:

$$b = W\beta$$

$$W \in \Re^{2N \times N_f}$$

where $\beta$ is a vector containing $N_f$ unconstrained fault parameters and W is a matrix whose columns form a basis for the fault subspace. This model may be used to characterize many faults of interest for the head-tracker application, including single pixel location, single fiducial location, etc. Plugging into the bias detection constraint:

$$\|P_E b\|^2 \le p_{det}^2$$

$$\|P_E W\beta\|^2 = \beta^T W^T P_E^T P_E W\beta = \beta^T W^T P_E W\beta = \beta^T D\beta \le 1$$

where $$D = \frac{1}{p_{det}^2} W^T P_E W \in \Re^{N_f \times N_f}.$$

This gives an ellipsoidal constraint on the fault parameters, $\beta$. If any linear combination of the columns in W is fully in the model space, D will have a zero eigenvalue and the corresponding eigenvector will be unbounded; defining the possible faults that may be mitigated.

To ensure the fault space is bounded and provides a coordinate transform to the fault parameters ($\beta$), the eigenvalue decomposition of D should be performed. An eigenvalue decomposition on D may be used to define a coordinate transform:

$$\beta^T D\beta = \beta^T V_D \Lambda_D V_D^T \beta = (\Lambda_D^{1/2} V_D^T \beta)^T (\Lambda_D^{1/2} V_D^T \beta) = \alpha^T \alpha$$

$$\alpha = \Lambda_D^{1/2} V_D^T \beta = T\beta$$

$$\beta = \Lambda_D V_D^{1/2} \alpha = T_{inv} \alpha$$

The constraint may then be rewritten as:

$$\|\alpha\| \le 1$$

The worst-case fault that can occur within this ellipsoid may be defined by maximum horizontal and vertical position biases. These are norms of linear functions of the state vector bias, which also applies to the head-tracker for the various groupings and linear combinations of states. Defining $y \in \Re^{N_y}$ as a vector quantity for a bias PL to be defined, the relationship between the bias in y and the state bias may be expressed as:

$$y_b = C\hat{x}_b = CAb = CAW\beta = CAWT_{inv}\alpha = Y\alpha$$

where $Y = CAWT_{inv} \in \Re^{N_y \times N_f}$. AW characterizes the impact of the fault basis vectors on state error. The search for the worst-case fault bias may then be expressed as a quadratic optimization problem with an ellipsoidal constraint:

$$\max \|Y\alpha\|$$

subject to $\|\alpha\| \le 1$. This is the definition of the induced 2-norm of matrix Y, meaning $$\|y_b\| \le \lambda_{max}(Y)$$

$$u_b = \text{eigen Vector}_{max}(Y)$$

This gives the desired bias PL, given a fault basis W and the output matrix C for the desired quantity to bound. This bound is conservative, since it assumes that the failure was in the worst direction with a magnitude to cause the maximum bias without being detected more than the MDR. If some knowledge of the fault distribution is known, a more conservative bound may be possible.

This procedure may be repeated for additional outputs of interest. The fault basis should be selected to cover all free parameters expected to vary during the fault. To handle different fault types (that are not expected to occur simultaneously), this method could be repeated for the different faults, and a worst-case or weighted PL may be taken.

The detectability criteria is:

$$D = \frac{1}{p_{det}^2} W^T P_E W \in \mathfrak{R}^{N_f \times N_f}$$

is rank $N_f$. Rank (PE)=2N-6, which is the dimension of the error space. Since this dimension of the error space is an upper bound on the rank of D, the fault dimension must be less than the error space dimension:

rank(D)=$N_f \leq$2N-6

Otherwise, some faults could lie entirely in the model space, making it undetectable using residual monitoring.

Assuming four points per fiducial:

| Number of Fiducials | Number of Equations | Dimension of Error Space |
|---|---|---|
| 1 | 8 | 2 |
| 2 | 16 | 10 |
| 3 | 24 | 18 |
| 4 | 32 | 26 |
| 5 | 40 | 32 |

In addition to requiring a minimum number of equations, detectability requires that no linear combination of fault basis vectors lie within the modeled space. Multiple 2D pixel errors generally are detectable (though PLs will be larger), provided that at least three pixels, required to estimate a head pose, are assumed to be unfaulted. A 3D fiducial point will not be detectable for snapshot pose, since the point can move along the line of sight without generating residuals. However, note that this motion will not create any reprojection error or state bias. To characterize a fault in a 3D fiducial, the fault could be expressed in terms of two detectable dimensions.

Intrinsic calibration errors may be undetectable for certain constellations, as focal length and camera center may be mistaken for camera translation. Extrinsic errors are also not detectable using snapshot optical pose, as they are indistinguishable from head pose. The corner cases of bias detectability can be further explored by considering the output and residual bias equations:

$y_b = CAW\beta = C(U_1 S_1^{-1} V_1^T)(U_{W1} S_{W1} V_{W1}^T)\beta$ $r_b = P_E W\beta = (U_0 U_0^T)(U_{W1} S_{W1} V_{W1}^T)\beta$ where $U_{W1} S_{W1} V_{W1}^T$ is the minimal singular value decomposition of W. If W has a null space, represented by $V_{W0}$, $\beta$ in that subspace will be undetectable in residuals and have no impact on the output bias. This occurs in the case of a 3D fiducial bias along the line of sight. If the span of W, represented by $U_{W1}$, has any direction that projects to zero in the error space, represented by $U_0$, the fault bias in that direction will be absorbed into state estimate bias, making the fault undetectable but with potentially unbounded impact on the output bias. This condition is identified by a rank-deficient $U_0^T U_{W1}$. This occurs in the case of intrinsic and extrinsic calibration bias. Another corner condition occurs for faults in the null space of CA, which will lead to zero output bias, even if the fault bias is unbounded.

Two of the main design parameters in the integrity algorithm are FPR and MDR. When selecting FPR and MDR, several factors may be considered. A low FPR is desirable, since that will provide more available measurements, increasing pose estimate availability and accuracy. A low MDR is also desirable, since MDR is multiplied by the a priori fault rate to determine integrity rates. The tradeoff being that lowering FPR increases the fault detection threshold, causing larger biases to escape detection for a given MDR. This requires larger PLs to bound the increased bias errors. If the larger PLs reach HMI alert limits (ALs), the pose estimation is no longer available for integrity applications. In some cases, this tradeoff may be adjusted by accounting for exposure rate of critical phases of flight and/or scheduling requirements. If FPR-MDR-AL tuning cannot reach an acceptable design, camera or constellation changes may be required to reduce sensor noise, increase the number of measurements, reduce DOPs, or improve fault observability.

In at least one embodiment, the $k^{th}$ pixel may have a fault bias; for example, if fiducial detection fails to extract the point correctly or a pixel is faulty. Adding a bias term for the $k^{th}$ pixel:

$$z[k] - z_0[k] = \begin{bmatrix} 1 & 0 \\ 0 & 1 \end{bmatrix} b_P[k]$$

where $b_P[k]$ is the pixel fault bias in $e_P[k]$, and $z_0[k]$ represents the unfaulted $k^{th}$ measurement. Defining:

$$\beta = b_P[k]$$

$$W_P[k] = \begin{bmatrix} 1 & 0 \\ 0 & 1 \end{bmatrix}$$

$$W = \begin{bmatrix} 0 \\ W_P[k] \\ 0 \end{bmatrix} \in \mathfrak{R}^{2N \times 2}$$

where $W_P[k]$ is placed in W in the two rows corresponding to $k^{th}$ pixel measurement in the measurement equation. This W matrix, after normalization by $R^{-1/2}$, may be used to compute a bias PL. For a single pixel fault hypothesis, $H_{1p}$, this process may be computed over each pixel measurement of interest and the worst one taken. For a multiple pixel fault hypothesis, $H_{2p+}$, multiple $W_P[k]$ matrices may be added to W, the limitation being that, eventually, the fault will be undetectable as more pixel faults are added.

In at least one embodiment, the $k^{th}$ 3D fiducial point may have a fault bias; for example, if a fiducial has been moved. Adding a bias term for the $k^{th}$ fiducial point:

$z[k] - z_0[k] = H_M[k] b_M[k]$ where $b_M[k]$ is the 3D fiducial point position fault bias in $x_M[k]$, and $z_0[k]$ represents the unfaulted $k^{th}$ measurement. If the 3D fiducial is moved along the line of sight, there will be no impact on the reprojection error, meaning that a 3D fiducial point position fault is not detectable. To make the fault detectable, the fault vector could be expressed in a "LOS" coordinate system, with the Z axis being along the line of sight from the camera focal point to the nominal fiducial. Then, the $z_{LOS}$ bias creates no reprojection error, giving:

$$z[k] = H_M[k]x_M[k] = H_M^{LOS}[k]x_M^{LOS}[k] = H_M^{LOSxy}[k]\begin{bmatrix} x_{LOS} \\ y_{LOS} \end{bmatrix}$$

where $H_M^{LOSxy}[k] \in \Re^{2 \times 2}$ is formed by expressing $H_M[k]$ in LOS coordinates and dropping the third column. The fault basis, $H_M^{LOSxy}[k]$, spans $\Re^2$. This single fiducial fault subspace is identical to the single pixel fault subspace. This implies that testing for a pixel bias is equivalent to testing for the impact of 3D fiducial bias on pixel location. The same cannot be said for extrinsic or intrinsic biases, as they affect all measurements.

For a single fiducial point fault hypothesis PL, $H_{1mp}$, this process may be computed over each fiducial point of interest and the worst one taken. For a multiple fiducial point fault hypothesis PL, $H_{2mp+}$, multiple $W_P[k]$ matrices may be added to W. Eventually the fault may become undetectable as more fiducial point faults are added. While the equations to compute $H_{1mp}$ and $H_{1p}$ PLs (and similarly $H_{2p+}$, $H_{2mp+}$) are identical, they may require separate calculations if the FPR/MDR allocations or list of potential failure points are different.

For QR or ArUco fiducials, multiple points may be used from a single fiducial (corners, finders, etc.) In this case, the single point fiducial fault model may not be appropriate, since multiple points on the fiducial are likely to fail simultaneously. In at least one embodiment, assume that all $N_{mp}$ fiducial points have failed independently, using the $H_{2mp+}$ fault hypothesis described herein. W is:

$$W = \begin{bmatrix} 0 \\ I_2 \\ I_2 \\ \vdots \\ I_2 \\ 0 \end{bmatrix} \in \Re^{2N \times 2}$$

where there are $N_{mp}$ identity matrices corresponding to the failed fiducial points. This will create a fault space dimension $2N_{mp}$, which may be acceptable when multiple fiducials are in view.

In another embodiment, only one point per fiducial in the measurement equation is used, reducing the number of available measurements, but also simplifying the measurement correlation and fault modeling.

In another embodiment, coarse pose checks may be used to screen faulty measurements. If a fiducial has shifted significantly, the coarse pose should be off for that fiducial, effectively screening for gross errors. Passing coarse pose checks could be used to restrain the fault space.

In another embodiment, solution separation/RANSAC may be used as a screening tool. Reprojected errors for the faulted fiducial when a pose is computed without the faulted fiducial should be large and a PL may be constructed that would miss detection of this check.

In another embodiment, corrections are made assuming the fiducial has moved as a rigid body, reducing the fault dimension to six or less.

Figure 6:
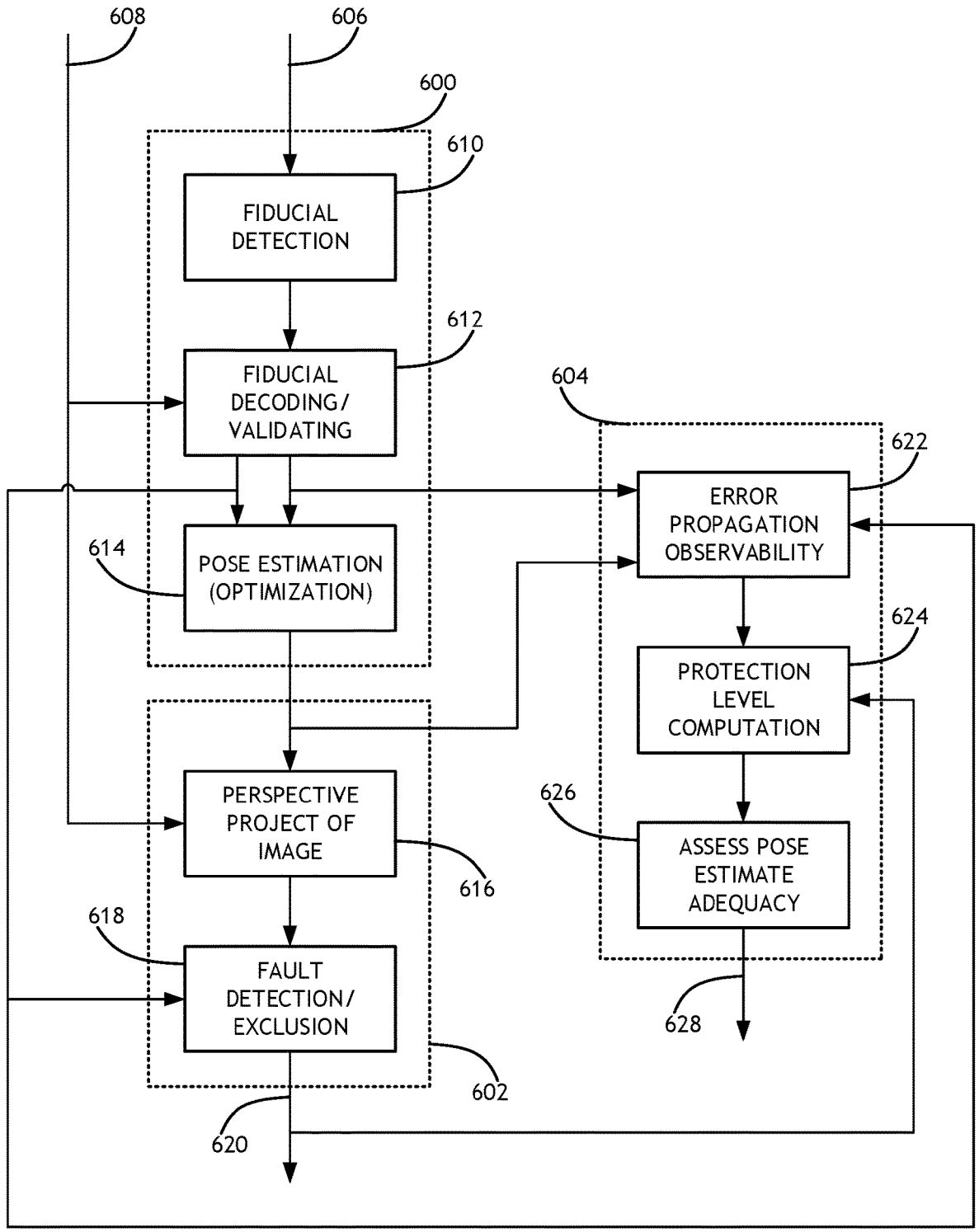
FIG. 6 shows a flowchart of a method for determining a head pose according to an exemplary embodiment of the inventive concepts disclosed herein.

Referring to FIG. 6, a flowchart of a method for determining a head pose according to an exemplary embodiment of the inventive concepts disclosed herein is shown. In at least one embodiment, optical features are extracted. Extraction starts by taking a captured image and applying a series of image processing operations to identify image regions that contain candidate fiducials. Each candidate fiducial is then decoded into a unique fiducial ID. The fiducial IDs are compared against a known fiducial constellation database, which contains the 3D location and ID of each fiducial expected in the platform.

Any detected fiducial IDs that do not match a fiducial in the constellation database may be discarded as an erroneous measurement. After discarding candidate fiducial IDs with no constellation match, the pose estimation function is provided an array of measured fiducial 2D pixel locations and the corresponding 3D location of each fiducial.

The pose estimation function estimates a six DOF head pose (3D position and orientation) by solving an optimization problem, minimizing the reprojection error defined as the difference between the measured 2D fiducial position and the expected fiducial position determined by projecting the 3D fiducial position onto the image plane for a given pose. The pose integrity function uses a first-order expansion of the reprojection error to determine the covariance of the pose estimate. This can be used to determine if the pose estimate is accurate enough to be used in an application. To mitigate potential faults, fault-detection may be performed to determine if the residual error is higher than expected. To further protect against undetected single-point faults, a H1 PL may be computed based on the largest pose bias that would escape detection at a given missed-detection rate. The covariance, combined with the H1 PL, may be used to provide integrity bounds that can be used to assess if the optical pose estimate is adequate for a given high-integrity application.

In at least one embodiment, an optical pose RAIM integrity monitoring process may be characterized by an estimation process 600, a monitoring process 602, and an error overbounding process 604. The estimation process 600 includes a fiducial detection function 610 that receives a captured image 606. The fiducial detection function 610 processes the captured image 606 to determine regions of the image that may contain coded fiducials. The fiducial detection function 610 may use techniques such as edge detection, corner detection, contour detection, etc. There may be a relatively high level of uncertainty associated with false detections (a candidate region is not an actual fiducial) and false identifications (a candidate region is actually a fiducial, but the 2D image region is incorrectly associated to an incorrect fiducial in the 3D fiducial database). Either one of these cases can cause erroneous pose estimates. To mitigate these cases, a fiducial decoding/validating function 612 validates the image regions.

In at least one embodiment, the fiducial decoding/validating function 612 establishes a high probability of correctly pairing 2D image points to 3D model points (correspondence integrity, as more fully described herein). The image region detected by the fiducial detection function 610 is analyzed to extract a binary code, $m_{est}$, also referred to as the fiducial ID. This fiducial ID estimated from the image is compared to a set of expected fiducial IDs present in the 3D model, also known as the constellation, from 3D model database 608. If the estimated fiducial does not match any of the expected fiducials, the estimate may be marked invalid. A CIE will occur if the estimated fiducial ID is within the constellation but it is not the correct fiducial ID. The probability of a CIE, $P_{CIE}$, can be designed to be sufficiently low by ensuring the fiducial has enough bits and the fiducial IDs in the constellation are well-spaced. The identified 2D image points and 3D model points are transferred to a pose estimation optimization function 614.

In at least one embodiment, the pose estimation optimization function 614 performs estimation and projection functions outlined herein. Given a pose estimate, $\hat{x}$, the expected location of the corresponding 2D pixels, $\hat{p}$, may be determined from the camera properties using perspective projection:

$$\hat{p}(\hat{x}) = f(\hat{x})$$

The pose estimate may then be determined by adjusting the pose to minimize the reprojection error between the expected pixel location and the measured location, $\tilde{p}$:

$$\hat{x} = \arg\min_x \|\tilde{p} - \hat{p}(\hat{x})\|$$

In at least one embodiment, during a monitoring process 602, a perspective projection function 616 receives the pose estimate from the pose estimation optimization function 614, and constellation data from the 3D model database 608. Perspective projection is used to compute the expected 2D pixel locations based, and the expected 2D pixel locations are used to determine if the pose is accurate. Such projection is then validated by a fault detection/exclusion function 618.

In at least one embodiment, if the pose estimate is correct, the reprojection error is expected to be small. because there is some modeled uncertainty in the measured 2D points and the resulting pose estimate, some small reprojection error is expected. If the reprojection error is larger than would be expected by the measurement error model, the measurements are not consistent with the model. This is unacceptable for a high-integrity solution, since an invalid model may cause pose errors to be larger than predicted by error propagation. Such error could be caused by a subset of faulty measurements, which may be identified and excluded from the solution for increased solution availability. The fault detection/exclusion function 618 is similar to fault detection used in GPS-RAIM. For example, if a Gaussian measurement error model is used, the reprojection errors will follow a Chi-square distribution, and a Chi-square hypothesis test may be used to detect faults. If the pose passes validation tests, an output 620 of the pose, and potentially of fault detection status of the pose are delivered to a corresponding application.

In at least one embodiment, contemporaneous with the monitoring process 602, an error overbounding process 604 includes an error propagation observability function 622 that receives the outputs from the fiducial decoding/validating function 612 and the pose estimate from the pose estimation optimization 614. Using a measurement error model and a first order expansion of the perspective projection function 616, the covariance of the pose estimate may be estimated. The covariance gives information pertaining to the pose estimate accuracy for all six degrees of freedom. Furthermore, it can be used to determine if there is insufficient data to estimate one or more of the pose degrees of freedom. In this case, it may be desirable to reformulate the pose estimation problem to eliminate unobservable degrees of freedom.

In at least one embodiment, a protection level (PL) computation function 624 receives the pose covariance from the error propagation observability function 622 and the output 620 including the fault detection status. PLs are used as an overbound on the pose estimate error, with some small, defined probability of exceedance. The pose covariance may be used to compute a PL under fault-free conditions. In addition, pose errors due to faults may also be included. While the fault detection test may have passed, some faults may go undetected. To account for these faults, the worst-case fault that will not be detected by fault detection (at an allowable missed detection rate) is computed, similarly to GPS-RAIM PL computation, with an extension to subspaces of 2D pixel measurements and 3D model points.

In at least one embodiment, the computed PL is transferred to a pose estimate adequacy function 626. Many applications have requirements for the accuracy of the pose estimate. Given the PLs, the pose estimate adequacy function 626 determines if the PL is below that required accuracy and outputs 628 that determination. If the pose estimate is not good enough, it should not be used for the application. A single pose estimate could be consumed by multiple applications, so it may fail the assessment for one application but pass for a less stringent application. In such circumstance case, the pose estimate may be used by the less stringent application.

While some exemplary embodiments described herein are specifically directed toward head tracking, it may be appreciated that other embodiments for pose tracing and verification are envisioned. For example, a pose of an aircraft on a landing approach may be determined and verified via the methodologies described herein using one or more cameras affixed to the aircraft and runway markings that operate as fiducials.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   at least one camera;
   a data storage element storing identification data corresponding to a set of fiducials, each comprising coded features distinct from each other; and
   at least one processor in data communication with the at least one camera, the data storage element, and a memory storing processor executable code for configuring the at least one processor to:
   receive one or more fiducial images from the camera;
   detect a plurality of fiducials in the one or more fiducial images;
   identify the coded features of each of the fiducials;
   determine an identification of each of the plurality of fiducials by comparing the coded features to the set of fiducials;
   produce a head pose estimation based on a known relative location and orientation of each of the identified fiducials;
   produce a projection of a perspective image based on the head pose estimation;
   determine a head pose covariance based on the head pose estimation, the plurality of fiducials, and the one or more fiducial images;

compare the perspective image to the one or more fiducial images;
determine a pose estimation fault status; and
determine a protection level based on the head pose covariance and the pose estimation fault status.

2. The computer apparatus of claim 1, wherein each of the plurality of fiducials comprises a quick response (QR) code.

3. The computer apparatus of claim 1, wherein each of the plurality of fiducials comprises an ArUco marker.

4. The computer apparatus of claim 1, wherein the processor executable code further configures the at least one processor to determine an orientation of each of the plurality of fiducials based on the coded features.

5. The computer apparatus of claim 1, wherein the processor executable code further configures the at least one processor to assess a head pose adequacy for each of a plurality of applications based on corresponding desired levels of accuracy for each of the plurality of applications.

6. A method for gauging the accuracy of a head pose estimate comprising:
detecting a plurality of fiducials in one or more fiducial images, each of the plurality of fiducials comprising coded features, distinct from each other;
identifying coded features of each of the fiducials;
determining an identification of each of the plurality of fiducials by comparing the coded features to a set of fiducials;
producing a head pose estimation based on a known relative location and orientation of each of the identified fiducials;
producing a projection of a perspective image based on the head pose estimation;
determining a head pose covariance based on the head pose estimation, the plurality of fiducials, and the one or more fiducial images;
comparing the perspective image to the one or more fiducial images;
determining a pose estimation fault status; and
determining a protection level based on the head pose covariance and the pose estimation fault status.

7. The method of claim 6, wherein each of the plurality of fiducials comprises a quick response (QR) code.

8. The method of claim 6, wherein each of the plurality of fiducials comprises an ArUco marker.

9. The method of claim 6, further comprising determining an orientation of each of the plurality of fiducials based on the coded features.

10. The method of claim 6, further comprising assessing a head pose adequacy for each of a plurality of applications based on corresponding desired levels of accuracy for each of the plurality of applications.

11. An aircraft comprising:
at least one camera;
a plurality of fiducials, each comprising coded features distinct from each other;
a data storage element storing identification data corresponding to the plurality of fiducials; and
at least one processor in data communication with the at least one camera, the data storage element, and a memory storing processor executable code for configuring the at least one processor to:
receive one or more fiducial images from the camera;
detect a plurality of fiducials in the one or more fiducial images;
identify the coded features of each of the fiducials;
determine an identification of each of the plurality of fiducials by comparing the coded features to the set of fiducials;
produce a head pose estimation based on a known relative location and orientation of each of the identified fiducials;
produce a projection of a perspective image based on the head pose estimation;
determine a head pose covariance based on the head pose estimation, the plurality of fiducials, and the one or more fiducial images;
compare the perspective image to the one or more fiducial images;
determine a pose estimation fault status; and
determine a protection level based on the head pose covariance and the pose estimation fault status.

12. The aircraft of claim 11, wherein each of the plurality of fiducials comprises a quick response (QR) code.

13. The aircraft of claim 11, wherein each of the plurality of fiducials comprises an ArUco marker.

14. The aircraft of claim 11, wherein the processor executable code further configures the at least one processor to determine an orientation of each of the plurality of fiducials based on the coded features.

15. The aircraft of claim 11, wherein the processor executable code further configures the at least one processor to assess a head pose adequacy for each of a plurality of applications based on corresponding desired levels of accuracy for each of the plurality of applications.

16. The aircraft of claim 11, wherein the plurality of fiducials is disposed within a cockpit of the aircraft.

17. The aircraft of claim 11, wherein the plurality of fiducials is disposed on a helmet of a pilot.

* * * * *